US012695602B2

(12) United States Patent
Afshar et al.

(10) Patent No.: US 12,695,602 B2
(45) Date of Patent: Jul. 28, 2026

(54) PASSWORD HARDENING FOR ELLIPTIC CURVE INTEGRATED ENCRYPTION SCHEMES

(71) Applicant: Coinbase, Inc., Oakland, CA (US)

(72) Inventors: Arash Afshar, Calgary (CA); Yehuda Lindell, Petah Tikva (IL); Guy Pe'er, Talmey Yechiel (IL)

( * ) Notice: Subject to any disclaimer, the term of this patent is extended or adjusted under 35 U.S.C. 154(b) by 97 days.

(21) Appl. No.: 18/737,798

(22) Filed: Jun. 7, 2024

(65) Prior Publication Data

US 2025/0379724 A1 Dec. 11, 2025

(51) Int. Cl.
| | |
|---|---|
| *H04L 9/08* | (2006.01) |
| *H04L 9/30* | (2006.01) |
| *H04L 9/32* | (2006.01) |

(52) U.S. Cl.
CPC .......... *H04L 9/0825* (2013.01); *H04L 9/0841* (2013.01); *H04L 9/3066* (2013.01); *H04L 9/3226* (2013.01); *H04L 9/3236* (2013.01)

(58) Field of Classification Search
CPC ... H04L 9/0825; H04L 9/0841; H04L 9/3066; H04L 9/3226; H04L 9/3236
USPC ........................................ 713/171
See application file for complete search history.

(56) References Cited

U.S. PATENT DOCUMENTS

| | | | |
|---|---|---|---|
| 10,999,276 B2 * | 5/2021 | Umezurike | ......... H04L 63/0876 |
| 2019/0132129 A1 * | 5/2019 | Martin | ...................... H04L 9/14 |
| 2023/0155811 A1 * | 5/2023 | Liu | ........................... H04L 9/14 |
| | | | 713/171 |
| 2023/0300615 A1 * | 9/2023 | Liu | ................... H04W 12/0433 |
| | | | 726/4 |

FOREIGN PATENT DOCUMENTS

WO WO-2023279283 A1 * 1/2023 ........... H04L 9/0866

* cited by examiner

*Primary Examiner* — Moeen Khan
(74) *Attorney, Agent, or Firm* — Holland & Hart LLP

(57) ABSTRACT

Methods, systems, and devices for data management are described. The described techniques may enable a user to password harden a ciphertext including a first elliptic curve point and an encrypted message such that an unauthorized user may query an enclave multiple times to decrypt the message. For example, the user may generate a second elliptic curve point using a user-provided password and modify the ciphertext using the second elliptic curve point. The user may decrypt the message by restoring the ciphertext and querying the enclave using the restored ciphertext. Accordingly, an unauthorized user may not obtain the message from the enclave unless the unauthorized user obtains the user-provided password or queries the enclave more than once.

17 Claims, 8 Drawing Sheets

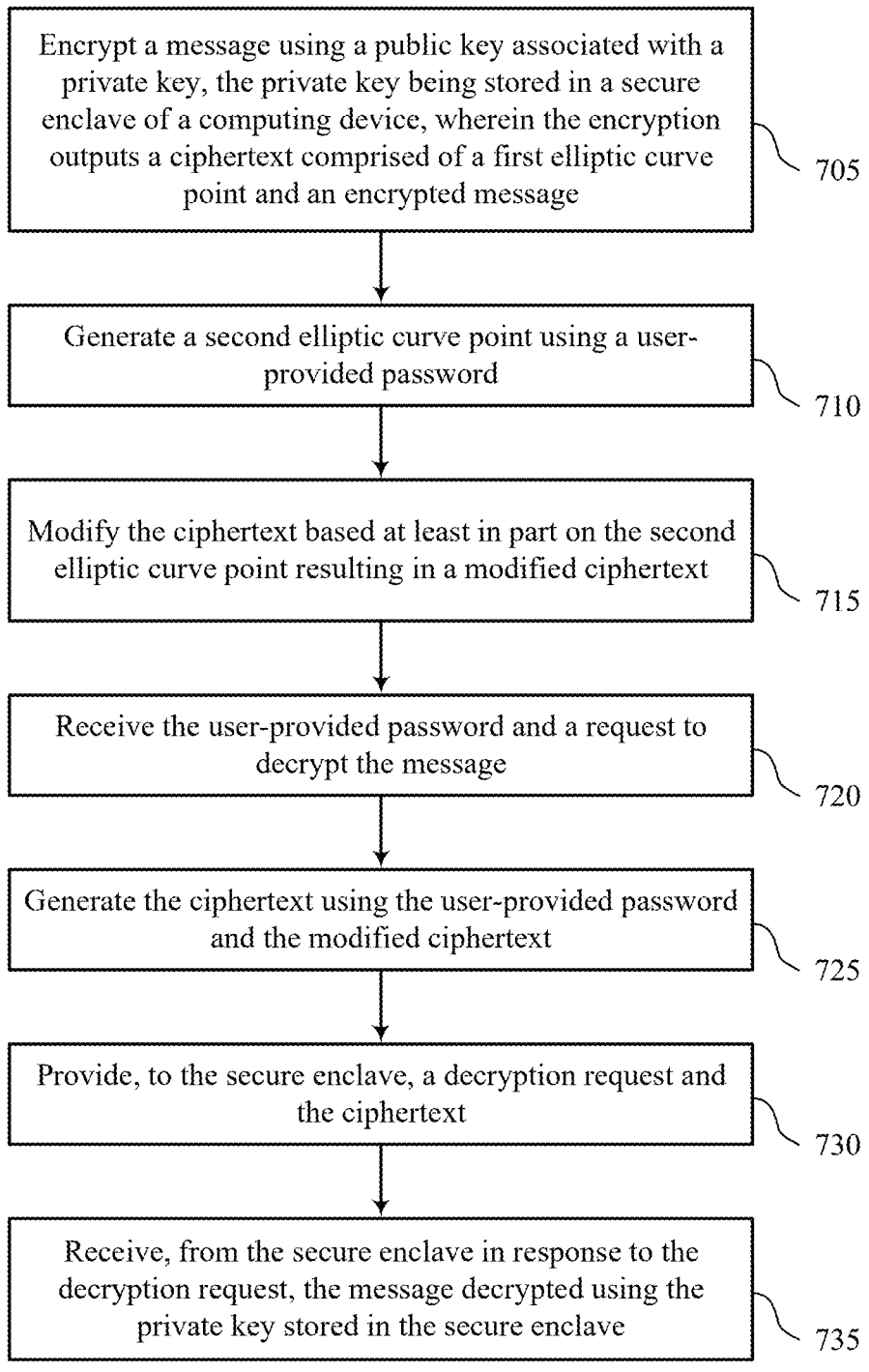

Encrypt a message using a public key associated with a private key, the private key being stored in a secure enclave of a computing device, wherein the encryption outputs a ciphertext comprised of a first elliptic curve point and an encrypted message

705

Generate a second elliptic curve point using a user-provided password

710

Modify the ciphertext based at least in part on the second elliptic curve point resulting in a modified ciphertext

715

Receive the user-provided password and a request to decrypt the message

720

Generate the ciphertext using the user-provided password and the modified ciphertext

725

Provide, to the secure enclave, a decryption request and the ciphertext

730

Receive, from the secure enclave in response to the decryption request, the message decrypted using the private key stored in the secure enclave

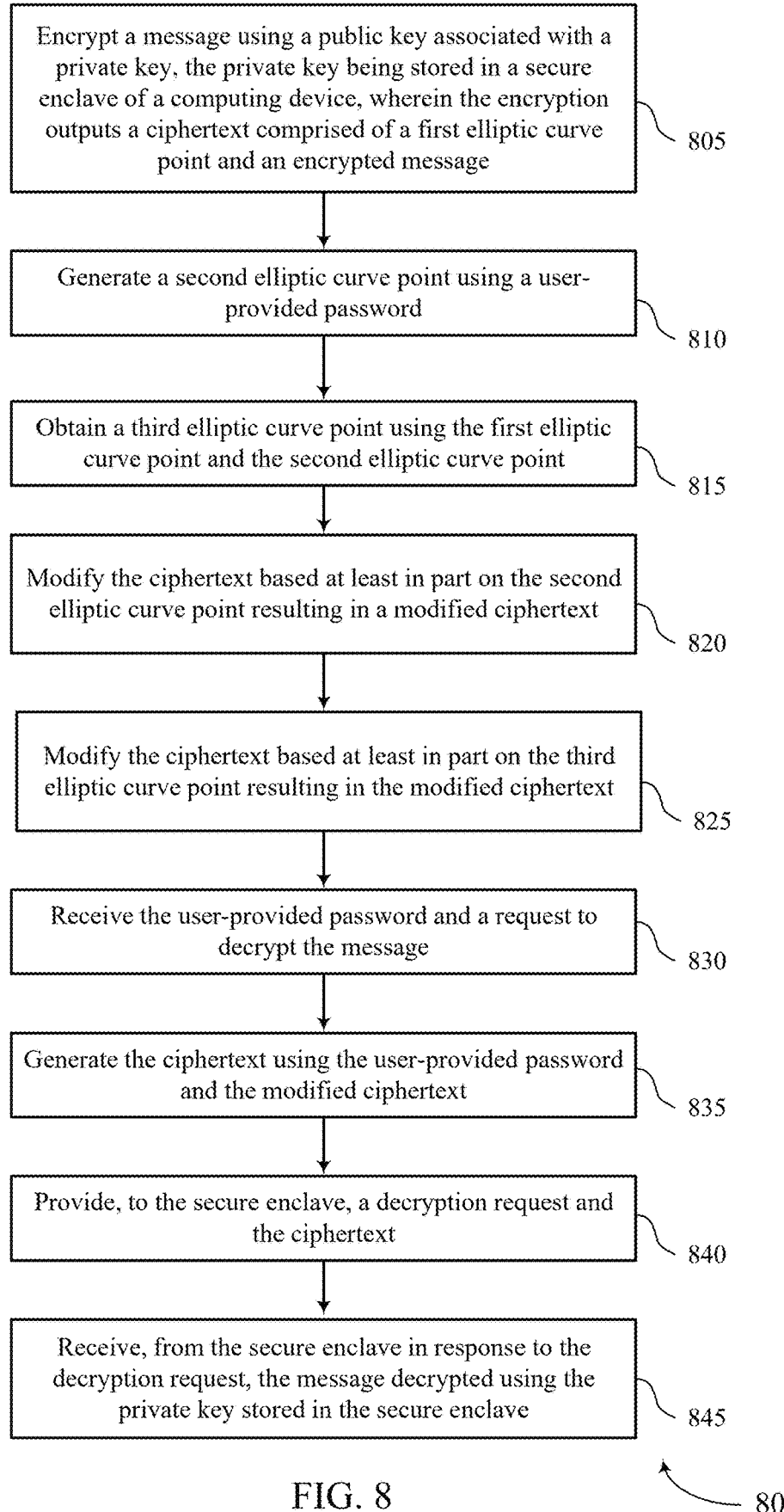

Encrypt a message using a public key associated with a private key, the private key being stored in a secure enclave of a computing device, wherein the encryption outputs a ciphertext comprised of a first elliptic curve point and an encrypted message

805

Generate a second elliptic curve point using a user-provided password

810

Obtain a third elliptic curve point using the first elliptic curve point and the second elliptic curve point

815

Modify the ciphertext based at least in part on the second elliptic curve point resulting in a modified ciphertext

820

Modify the ciphertext based at least in part on the third elliptic curve point resulting in the modified ciphertext

825

Receive the user-provided password and a request to decrypt the message

830

Generate the ciphertext using the user-provided password and the modified ciphertext

835

Provide, to the secure enclave, a decryption request and the ciphertext

840

Receive, from the secure enclave in response to the decryption request, the message decrypted using the private key stored in the secure enclave

PASSWORD HARDENING FOR ELLIPTIC CURVE INTEGRATED ENCRYPTION SCHEMES

The present disclosure relates generally to data management, including techniques for password hardening for elliptic curve integrated encryption schemes.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

BRIEF DESCRIPTION OF THE DRAWINGS

FIGS. 7 and 8 show flowcharts illustrating methods that support password hardening for elliptic curve integrated encryption schemes in accordance with aspects of the present disclosure.

DETAILED DESCRIPTION

A user may leverage an elliptic curve integrated encryption scheme (ECIES) to encrypt a message on a user device. For example, the device may encrypt a secret key used to access a digital wallet using the ECIES. The device may use a public encryption key associated with the ECIES to obtain a ciphertext associated with the message, which may include a point on an elliptic curve and an encoded message. The device may decrypt the message by querying an enclave (e.g., an enclave stored on a user device) with the ciphertext, which may decrypt the message using a decryption key associated with the ECIES and securely stored and accessible via the enclave. In some examples, the user may further protect the message by encrypting the message with a user-provided password prior to encryption using the ECIES, or by encrypting the ciphertext using the user-provided password after encryption using the ECIES. However, if an unauthorized user accesses the ciphertext, the unauthorized user may decrypt the ciphertext via the enclave by querying the enclave a single time, which may be relatively less secure than encryption schemes for which the unauthorized user may query the enclave more than once. More particularly, encryption of the ciphertext after encryption of the message using the ECIES encryption key or encryption of the message before encryption using the ECIES encryption key may be subject to attacks.

Accordingly, techniques described herein may enable the user to password harden the encrypted message such that an unauthorized user may query the enclave multiple times to decrypt the message. For example, the user may generate a second elliptic curve point using a hash of the user-provided password and modify the ciphertext using the second elliptic curve point (e.g., by adding the second elliptic curve point to the elliptic curve point in the ciphertext to generate a third elliptic curve point). The user may decrypt the message by restoring the ciphertext (e.g., by subtracting the second elliptic curve point from the third elliptic curve point) and querying the enclave using the restored ciphertext. Accordingly, an unauthorized user may not obtain the message from the enclave unless the unauthorized user obtains the user-provided password or queries the enclave multiple types via a brute force attack. However, because the enclave has hardware and/or software enforced limits on the quantity and frequency of queries, such an attack may be prohibitive.

Figure 1:
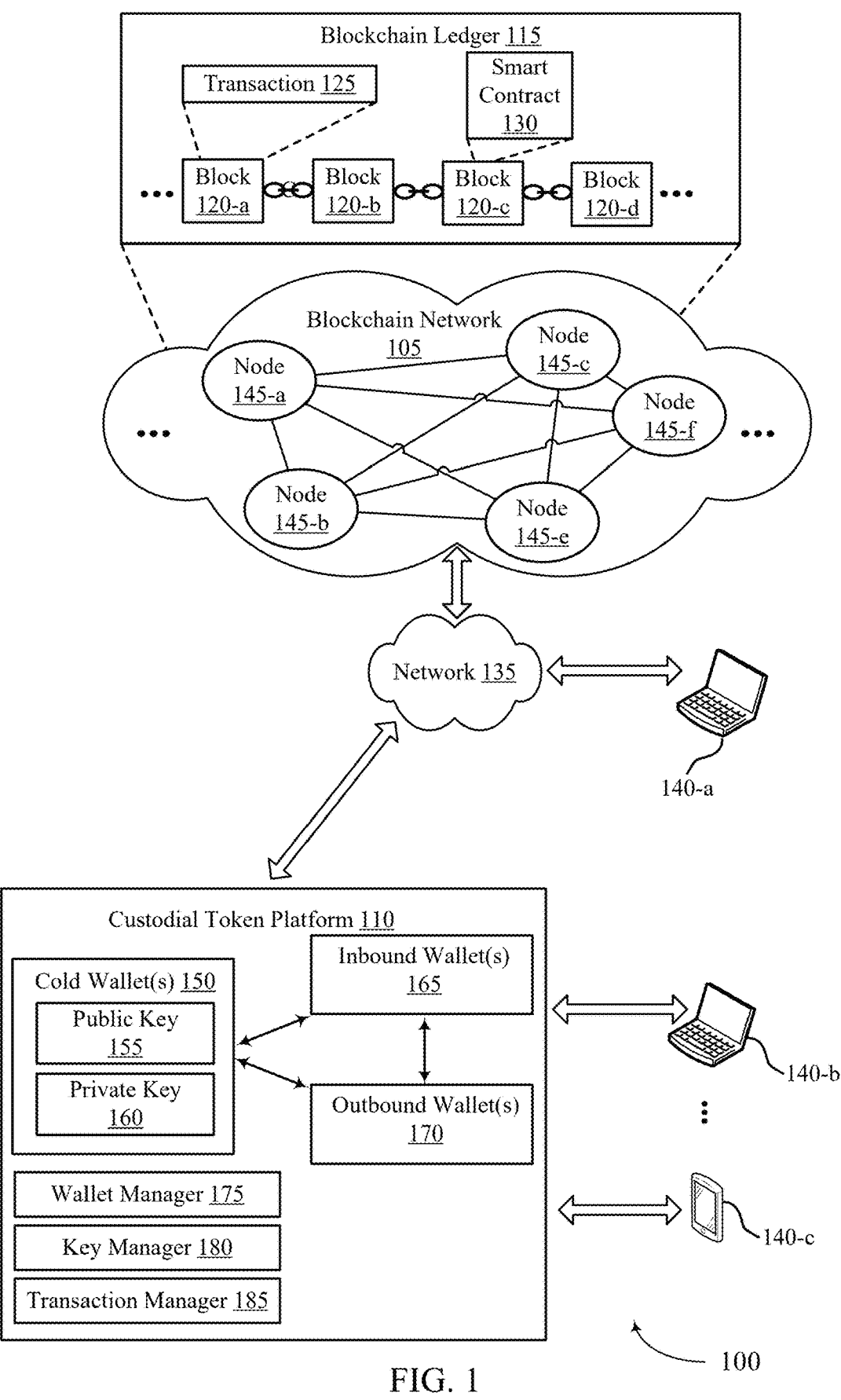
FIG. 1 illustrates an example of a computing environment that supports password hardening for elliptic curve integrated encryption schemes in accordance with aspects of the present disclosure.

FIG. 1 illustrates an example of a computing environment 100 that supports password hardening for elliptic curve integrated encryption schemes in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105 (e.g., a node 145-*a*, a node 145-*b*, a node 145-*c*, a node 145-*e*, a node 145-*f*), and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a sub-program that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-*a* may provide user inputs via the computing device 140-*a*, which may result in commands, data, or any combination thereof being communicated via the network 135 to the computing system custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital assets between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to an external wallet, to deploy a smart contract (e.g., a self-executing program), or to call a smart contract.

In some examples, a computing device 140 may encrypt a message (e.g., m) using ECIES. For example, the computing device 140 may generate a ciphertext of the form (R, CT)=ecies(ek, m), where R is a point (e.g., a random point) on an elliptic curve and CT is an authenticated-encryption ciphertext (e.g., the encrypted message). As described herein, an elliptic curve may be a mathematical formula that defines a two-dimensional curve with x and y coordinates (e.g., elliptic curve (EC) points). An elliptic curve used for ECIES may be an elliptic curve for which certain cryptographic operations (e.g., encrypting and decrypting messages for ECIES) are secure. The elliptic curve may be associated with a generator point G and an order q. The computing device 140 may create CT using an authenticated symmetric key encryption scheme, such as advanced encryption standard (AES)-Galois/Counter Mode (GCM) encryption.

In some examples, ECIES may use elliptic curve Diffie-Hellman key exchange (EDCH), which may be an encryption protocol for which two parties may agree on a secret key without sharing secret information. For example, for EDCH, each party may derive a public key by multiplying an elliptic curve generator point G by a private key. A first party may obtain a secret key by obtaining the public key of a second party and multiplying the private key of the first party with the public key of the second party. The generator point G and the private keys a and b may have a property b*(a*G)=a*(b*G), such that each party may generate a same secret key.

Techniques described herein may enable a device (e.g., computing device 140) to encrypt a message (e.g., a private key 160) using password-hardened ECIES. For example, the device may encrypt the message using a public ECIES encryption key to generate ciphertext including a first elliptic curve point and the encrypted message. The device may password harden the encrypted message using a user-provided password. For example, the device may generate a second elliptic curve point using a hash of the user-provided password and modify the ciphertext using the second elliptic curve point by adding the second elliptic curve point to the elliptic curve point in the ciphertext to generate a third elliptic curve point.

The device may decrypt the message by querying a secure enclave stored on a user device. As described herein, an enclave (e.g., a hardware enclave) may be a secure hardware that can perform cryptographic operations without enabling an unauthorized user (e.g., an adversary) to extract secret keys used within the enclave. The device may restore the ciphertext by subtracting the second elliptic curve point from the third elliptic curve point. The device may provide the secure enclave with the restored ciphertext and a request to decrypt the message using a private decryption key associated with the public encryption key (e.g., a private decryption key stored in the secure enclave). The secure enclave may therefore decrypt the message and provide the decrypted message to the user (e.g., via a user interface). While some techniques described herein are described with reference to protecting cryptographic keys in the context of blockchain scenarios, it should be understood that the techniques are applicable in other contexts.

Figure 2:
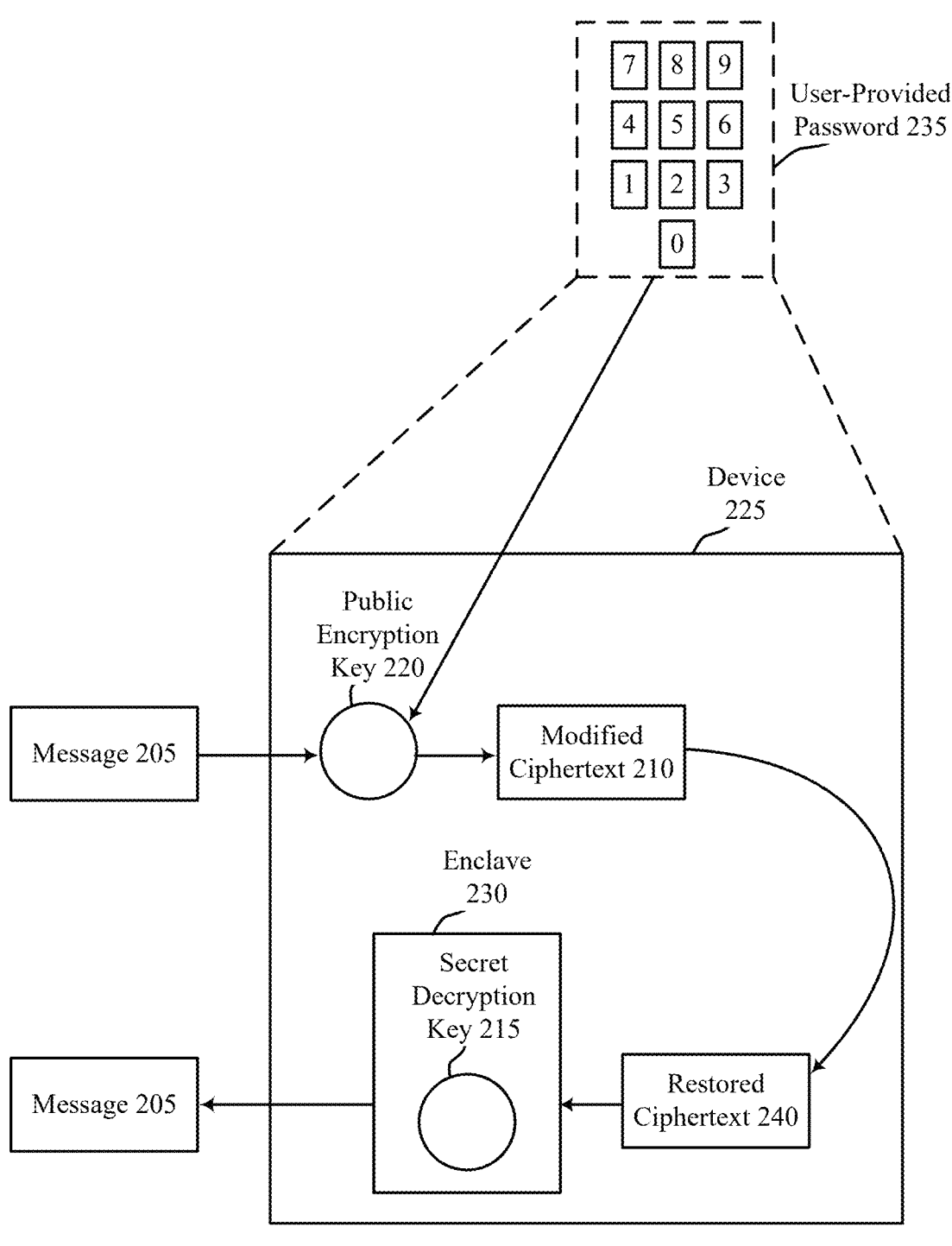
FIG. 2 shows an example of a system that supports password hardening for elliptic curve integrated encryption schemes in accordance with aspects of the present disclosure.

FIG. 2 shows an example of a system 200 that supports password hardening for elliptic curve integrated encryption schemes in accordance with aspects of the present disclosure. The system 200 may implement or may be implemented by aspects of the computing environment 100. For example, the system 200 may include a device 225, which may be an example of the computing devices 140 as described with respect to FIG. 1.

The device 225 may include an enclave 230 (e.g., a secure enclave), which may be an example of a hardware and/or software based component (e.g., a secure chip) that is used to isolate sensitive data and processing from the rest of the device. The enclave 230 may function as a coprocessor within or separate from a main processor of the device 225. The enclave 230 may be used to manage cryptographic keys and perform sensitive functions, such as biometric data processing, to authenticate access to device features and data. This compartmentalization enhances security by limiting the data's exposure to only the necessary parts of the system. As described herein, the enclave, depending on the version and configuration, may support various types of cryptographic operations and various versions thereof, such as ECIES.

Techniques are described herein with respect to encrypting, protecting, and/or decrypting a message. The message may be any type of information such as a private key. In some examples, the message is a private key of a blockchain wallet, and the private key is used to access and send crypto tokens attributed to the wallet. As such, it is important to secure and protect the private key from unauthorized use.

In some examples, if an enclave 230 of a device 225 supports ECIES, the device 225 may encrypt a message 205 (e.g., a private key 160, a private decryption key, a secret message) using ECIES (e.g., enc, dec). As described herein, ECIES may be a public key encryption scheme, where dk is a secret decryption key 215 (e.g., k) and ek is a public encryption key 220 (e.g., Q). By encrypting the message 205 (e.g., m) using the ECIES, a device 225 may generate a ciphertext of the form (R, CT)=ecies (ek, m), where R is a point (e.g., a random point) on an elliptic curve and CT is an authenticated-encryption ciphertext (e.g., the encrypted message 205). The elliptic curve may be associated with a generator point G and an order q. The device 225 may create CT using an authenticated symmetric key encryption scheme, such as AES-GCM encryption.

In some examples, if the enclave 230 supports ECDH (e.g., but not full ECIES), the device 225 may choose a value r (e.g., a random value) from the mathematical order q of the elliptic curve. The device 225 may compute an elliptic curve point value R such that R=r*G (e.g., where G is the generator point of the elliptic curve). The device 225 may call the enclave EDCH to receive an encryption key Q=r*ek, and may generate a key k using k=KDF(Q) (e.g., where KDF is a key derivation function such as SHA-256). The device 225 may generate an encrypted message 205 (e.g., CT) as CT=AES-GCM-Enc(k, m), AES-CTR-Enc(k, m), or HMAC-Enc(k,m) (e.g., where m is the message 205, AES-GCM-Enc is an encryption for an AES-GCM encryption scheme, AES-CTR-Enc is an encryption for an AES-counter (CTR) encryption scheme, and HMAC-Enc is an encryption for a hash-based message authentication code (HMAC) encryption scheme). The device 225 may accordingly store the ciphertext (R, CT). The ciphertext may be stored in memory of the device 225 or in a place external to the device, such as in a secure cloud environment.

In some examples, if the enclave 230 supports symmetric encryption operations such as HMAC (e.g., rather than ECIES or ECDH), the device 225 may obtain a public encryption key 220 ek from the enclave 230, where ek=dk*G (e.g., the secret decryption key 215 multiplied by the generator point of the elliptic curve) and where dk=HMAC (password), where HMAC is computed in the enclave 230 using a key that is unknown to the device 225. The device 225 may encode the message 205 to obtain the ciphertext according to (R, CT)=enc (ek, m) (e.g., where m is the message 205). The device 225 may accordingly store the ciphertext (R, CT).

In some examples, to decrypt the message 205, the device 225 (e.g., a computing device 140, a smartphone) may query the enclave 230 that stores the secret decryption key 215 (e.g., dk) with the ciphertext and a request to decrypt the message 205. The enclave 230 may accordingly decrypt the message 205 and output the decrypted message 205 to the device 225 (e.g., via a user interface or application). In some examples, the enclave 230 may support full ECIES, ECDH, or symmetric operations such as HMAC.

However, an unauthorized user may gain access to the ciphertext and attempt to decrypt the message 205. For example, as part of a brute force attack, the unauthorized user may steal the ciphertext and attempt to decrypt the ciphertext using all possible values of the secret decryption key 215. Such brute force attacks may last for a relatively longer duration than some other unauthorized decryption attempts. For example, the unauthorized user may gain control of the device 225 storing the enclave 230. The unauthorized user may therefore query the enclave 230, which may enable the unauthorized user to immediately decrypt the ciphertext and obtain the message 205.

The user may therefore use a user-provided password 235 to add an additional layer of security to the ECIES encryption. As a first example, the user may encrypt the message 205 using the user-provided password 235 prior to encrypting using the public encryption key 220. In such examples, however, the unauthorized user may query the enclave 230 to obtain the password-encrypted message, and may use an offline dictionary attack (e.g., by trying a list of common passwords to find a password that matches the password-encrypted message) on the password-encrypted message to generate the message 205. As a second example, the user may encrypt the ciphertext with the user-provided password. In such examples, however, the unauthorized user may run the offline dictionary attack on the encrypted ciphertext (e.g., to generate a ciphertext with a valid elliptic curve point R) and may query the enclave 230 with the decrypted ciphertext. That is, in each example, the unauthorized user may query the enclave 230 a single time to decrypt the message 205, which may result in a relatively less secure encryption than in examples in which the unauthorized user may query the enclave more than once (e.g., multiple times to perform a brute force attack). That is, the enclave may implement software and/or hardware enforced limitations on the quantity and/or frequency of queries. Thus, techniques that force the attacker to query the enclave many times may improve security.

Accordingly, to prevent such offline dictionary attacks from enabling the unauthorized user to obtain the message 205, the device 225 may use the user-provided password to modify the elliptic curve point R of the ciphertext to another elliptic curve point generate a modified ciphertext 210. For example, the device 225 may receive a user-provided password 235 (e.g., one or more letters, numbers, special characters, and the like) and salt (e.g., random data) from the user. The device 225 may convert the user-provided password 235 and the salt to a point on the elliptic curve defined by G and q. For example, the device 225 may hash the values of the user-provided password 235 and the salt and interpret the result as a first coordinate (e.g., an x coordinate) on the elliptic curve. Other types of functions to convert the password (and salt) to a coordinate on the elliptic curve are contemplated within the scope of the present disclosure. The device 225 may locate the second coordinate (e.g., a y coordinate) that corresponds to the first coordinate on the elliptic curve, and may thereby obtain a second elliptic curve point A. Note that the initial ciphertext (R, CT) may be generated using the techniques described herein such as via ECIES, ECDH, and symmetric operations (e.g., HMAC)

The device 225 may generate the modified ciphertext 210 by replacing the elliptic curve point R in the ciphertext with a third elliptic curve point B, where B=R+A. Accordingly, the first portion of the ciphertext (e.g., the elliptic curve point) may be masked with the user-provided password 235 and the salt. The device 225 may output (e.g., and store) the modified ciphertext 210 (e.g., (B, CT)).

To decrypt the message, the device 225 may remove the password hardening to obtain a restored ciphertext 240 (e.g., (R, CT)) that may be decrypted by the enclave 230. For example, the user may provide the user-provided password 235 and the salt to the device 225, and the device 225 may re-generate the second elliptic curve point A (e.g., by hashing the user-provided password 235 and the salt, identifying the first coordinate, and identifying the second coordinate). The device 225 may subtract A from B to obtain the first elliptic curve point R (e.g., where R=B–A) and may output the restored ciphertext 240 (e.g., (R, CT)).

The device 225 may query the enclave 230 with the restored ciphertext 240 and a request to decrypt the message 205. The enclave 230 may use the secret decryption key 215 to output the decrypted message 205. In some examples, if the enclave 230 supports ECIES, the secret decryption key 215 may be a key dk that outputs m (e.g., the message 205) when given (R, CT).

Figure 3:
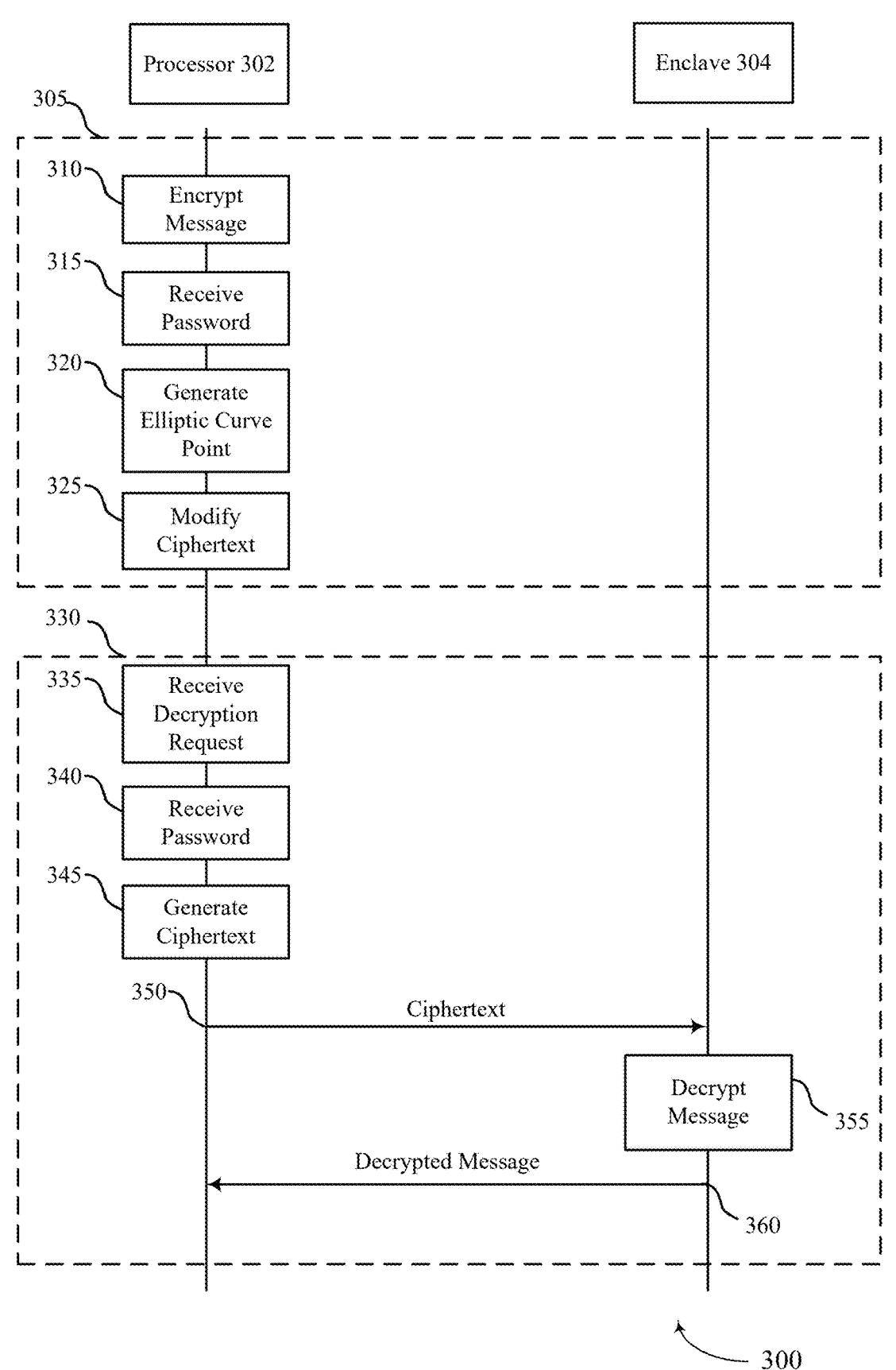
FIG. 3 shows an example of a process flow that supports password hardening for elliptic curve integrated encryption schemes in accordance with aspects of the present disclosure.

FIG. 3 shows an example of a process flow 300 that supports password hardening for elliptic curve integrated encryption schemes in accordance with aspects of the present disclosure. The process flow 300 may implement or may be implemented by aspects of the computing environment 100 or the system 200. For example, the process flow 300 may include a processor 302 and an enclave 304, which may be examples of components of a computing device 140 as described with reference to FIGS. 1 and 2.

In the following description of the process flow 300, the operations between the processor 302 and the enclave 304 may occur in a different order than the example order shown and, in some examples, may be performed by one or more different devices other than those shown as examples. Some operations also may be omitted from the process flow 300, and other operations may be added to the process flow 300. Further, although some operations or signaling may be shown to occur at different times for discussion purposes, these operations may actually occur at the same time.

At 305, a processor 302 of a user device may perform an encryption procedure in accordance with password hardening techniques for ECIES described herein. For example, at 310, the processor 302 may encrypt a message (e.g., a secret message, a secret key). The processor 302 may encrypt the message using a public encryption key that is associated with a private decryption key stored in an enclave 304 (e.g., a secure enclave of the user device). The encryption may output ciphertext including a first elliptic curve point and an encrypted message. The processor 302 may perform the operations here based on an application that is executable on the device. For example, a custodial token platform application or blockchain wallet application may trigger the operations described herein to secure some information, such as a private key.

In some examples, the encryption may be based on a configuration (e.g., hardware support) of the enclave 304. For example, if the enclave 304 supports ECIES, the processor 302 may encrypt the message using ECIES. If the enclave 304 supports EDCH, the processor 302 may encrypt the message using EDCH. If the enclave 304 supports symmetric cryptographic operations, the processor 302 may encrypt the message using symmetric cryptographic operations.

At 315, the processor 302 may receive a user-provided password. At 320, the processor 302 may generate a second elliptic curve point using the user-provided password. For example, the processor 302 may hash one or more values of the user-provided password to obtain a first coordinate of the second elliptic curve point. The processor 302 may compute a second coordinate of the second elliptic curve point based on the first coordinate (e.g., by locating an elliptic curve point that includes the first coordinate).

At 325, the processor 302 may modify the ciphertext using the second elliptic curve point. For example, the processor 302 may add the first elliptic curve to the second elliptic curve point to generate a third elliptic curve point. The processor 302 may modify the ciphertext by replacing the first elliptic curve point in the ciphertext with the third elliptic curve point, and may store the resulting modified ciphertext.

At 330, a processor 302 of a user device may perform a decryption procedure. For example, at 335, the processor 302 may receive a request to decrypt the encrypted message (e.g., from the user). At 340, the processor 302 may receive the user-provided password.

At 345, the processor 302 may generate the ciphertext (e.g., may restore the modified ciphertext to the original ciphertext). For example, the processor 302 may generate the second elliptic curve point using the user-provided password. The processor 302 may generate the first elliptic curve point using the second elliptic curve point (e.g., by subtracting the second elliptic curve point from the third elliptic curve point). The processor 302 may therefore obtain the first elliptic curve point and generate the original ciphertext.

At 350, the processor 302 may query the enclave 304. For example, the processor 302 may provide the ciphertext (e.g., the original ciphertext) to the enclave 304. The processor 302 may provide a request for the enclave 304 to decrypt the message.

At 355, the enclave 304 may decrypt the encrypted message using the provided ciphertext and the private decryption key. For example, the enclave 304 may decrypt the message according to ECIES, EDCH, or symmetric cryptographic operations. At 360, the processor 302 may receive the decrypted message from the enclave 304 in response to the description request.

Figure 4:
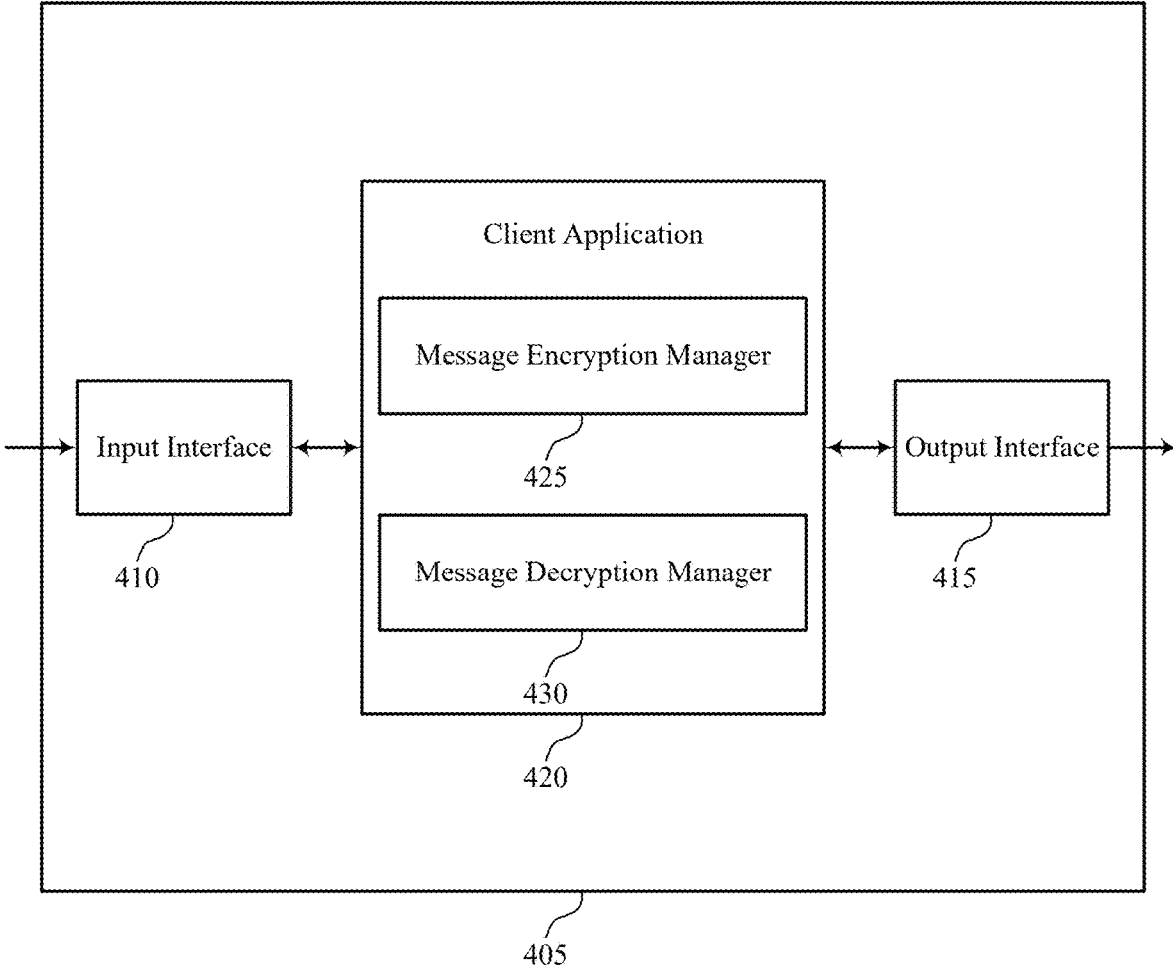
FIG. 4 shows a block diagram of an apparatus that supports password hardening for elliptic curve integrated encryption schemes in accordance with aspects of the present disclosure.

FIG. 4 shows a block diagram 400 of a device 405 that supports password hardening for elliptic curve integrated encryption schemes in accordance with aspects of the present disclosure. The device 405 may include an input interface 410, an output interface 415, and a client application 420. The device 405, or one or more components of the device 405 (e.g., the input interface 410, the output interface 415, the client application 420), may include at least one processor, which may be coupled with at least one memory, to support the described techniques. Each of these components may communicate, directly or indirectly, with one another (e.g., via one or more buses, communications links, communications interfaces, or any combination thereof).

The input interface 410 may manage input signaling for the user device 405. For example, the input interface 410 may receive input signaling (e.g., messages, packets, data, instructions, commands, transactions, or any other form of encoded information) from other systems or devices. The input interface 410 may send signaling corresponding to (e.g., representative of or otherwise based on) such input signaling to other components of the user device 405 for processing. For example, the input interface 410 may transmit such corresponding signaling to the client application 420 to support password hardening for elliptic curve integrated encryption schemes. In some cases, the input interface 410 may be a component of a communication interface 610 as described with reference to FIG. 6.

The output interface 415 may manage output signaling for the user device 405. For example, the output interface 415 may receive signaling from other components of the user device 405, such as the client application 620, and may transmit such output signaling corresponding to (e.g., representative of or otherwise based on) such signaling to other systems or devices. In some cases, the output interface 415 may be a component of a user interface 625 as described with reference to FIG. 6.

For example, the client application 420 may include a message encryption manager 425 a message decryption manager 430, or any combination thereof. In some examples, the client application 420, or various components thereof, may be configured to perform various operations (e.g., receiving, monitoring, transmitting) using or otherwise in cooperation with the input interface 410, the output interface 415, or both. For example, the client application 420 may receive information from the input interface 410, send information to the output interface 415, or be integrated in combination with the input interface 410, the output interface 415, or both to receive information, transmit information, or perform various other operations as described herein.

The client application 420 may support encryption in accordance with examples as disclosed herein. The message encryption manager 425 may be configured as or otherwise support a means for encrypting a message using a public key associated with a private key, the private key being stored in a secure enclave of a computing device, wherein the encryption outputs a ciphertext comprised of a first elliptic curve point and an encrypted message. The message encryption manager 425 may be configured as or otherwise support a means for generating a second elliptic curve point using a user-provided password. The message encryption manager 425 may be configured as or otherwise support a means for modifying the ciphertext based at least in part on the second elliptic curve point resulting in a modified ciphertext. The message decryption manager 430 may be configured as or otherwise support a means for receiving the user-provided password and a request to decrypt the message. The message decryption manager 430 may be configured as or otherwise support a means for generating the ciphertext using the user-provided password and the modified ciphertext. The message decryption manager 430 may be configured as or otherwise support a means for providing, to the secure enclave, a decryption request and the ciphertext. The message decryption manager 430 may be configured as or otherwise support a means for receiving, from the secure enclave in response to the decryption request, the message decrypted using the private key stored in the secure enclave.

Figure 5:
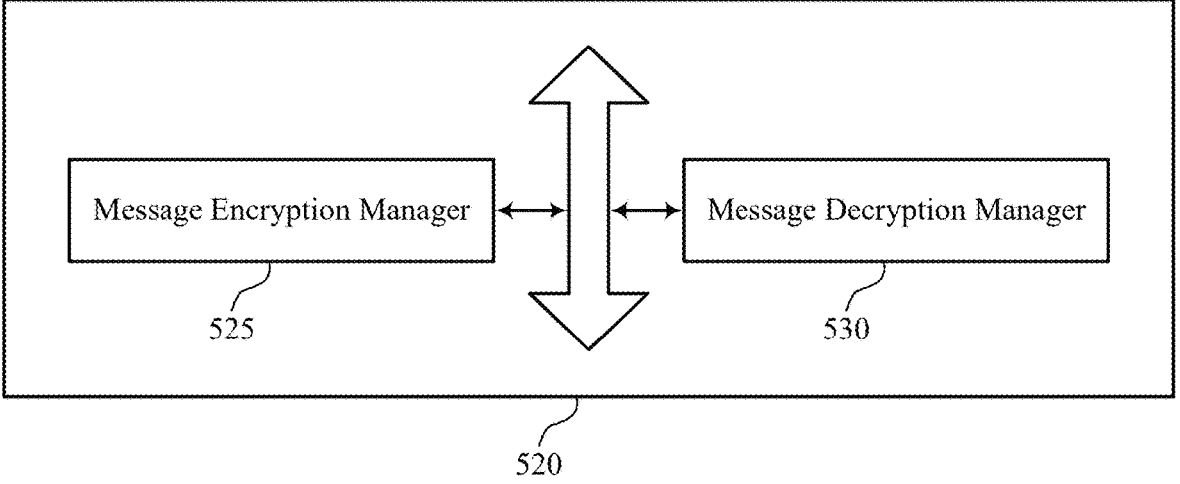
FIG. 5 shows a block diagram of a client application that supports password hardening for elliptic curve integrated encryption schemes in accordance with aspects of the present disclosure.

FIG. 5 shows a block diagram 500 of a client application 520 that supports password hardening for elliptic curve integrated encryption schemes in accordance with aspects of the present disclosure. The client application 520 may be an example of aspects of a client application or a client application 420, or both, as described herein. The client application 520, or various components thereof, may be an example of means for performing various aspects of password hardening for elliptic curve integrated encryption schemes as described herein. For example, the client application 520 may include a message encryption manager 525 a message decryption manager 530, or any combination thereof. Each of these components may communicate, directly or indirectly, with one another (e.g., via one or more buses, communications links, communications interfaces, or any combination thereof).

The client application 520 may support encryption in accordance with examples as disclosed herein. The message encryption manager 525 may be configured as or otherwise support a means for encrypting a message using a public key associated with a private key, the private key being stored in a secure enclave of a computing device, wherein the encryption outputs a ciphertext comprised of a first elliptic curve point and an encrypted message. In some examples, the message encryption manager 525 may be configured as or otherwise support a means for generating a second elliptic curve point using a user-provided password. In some examples, the message encryption manager 525 may be configured as or otherwise support a means for modifying the ciphertext based at least in part on the second elliptic curve point resulting in a modified ciphertext. The message decryption manager 530 may be configured as or otherwise support a means for receiving the user-provided password and a request to decrypt the message. In some examples, the message decryption manager 530 may be configured as or otherwise support a means for generating the ciphertext using the user-provided password and the modified ciphertext. In some examples, the message decryption manager 530 may be configured as or otherwise support a means for providing, to the secure enclave, a decryption request and the ciphertext. In some examples, the message decryption manager 530 may be configured as or otherwise support a means for receiving, from the secure enclave in response to the decryption request, the message decrypted using the private key stored in the secure enclave.

In some examples, to support modifying the ciphertext, the message encryption manager 525 may be configured as or otherwise support a means for obtaining a third elliptic curve point using the first elliptic curve point and the second elliptic curve point. In some examples, to support modifying the ciphertext, the message encryption manager 525 may be configured as or otherwise support a means for modifying the ciphertext based at least in part on the third elliptic curve point resulting in the modified ciphertext.

In some examples, to support generating the ciphertext, the message encryption manager 525 may be configured as or otherwise support a means for generating the second elliptic curve point using the user-provided password. In some examples, to support generating the ciphertext, the message encryption manager 525 may be configured as or otherwise support a means for generating the first elliptic curve point using the second elliptic curve point and the third elliptic curve point. In some examples, to support generating the ciphertext, the message encryption manager

525 may be configured as or otherwise support a means for generating the ciphertext based at least in part on the first elliptic curve point.

In some examples, to support generating the second elliptic curve point, the message encryption manager 525 may be configured as or otherwise support a means for hashing one or more values of the user-provided password to obtain a first coordinate of the second elliptic curve point. In some examples, to support generating the second elliptic curve point, the message encryption manager 525 may be configured as or otherwise support a means for computing a second coordinate of the second elliptic curve point based at least in part on the first coordinate.

In some examples, to support encrypting the message, the message encryption manager 525 may be configured as or otherwise support a means for encrypting the message based at least in part on a configuration of the secure enclave of the computing device.

In some examples, the configuration supports an elliptic curve integrated encryption scheme (ECIES) protocol and. In some examples, the message is encrypted based at least in part on the ECIES protocol.

In some examples, the configuration supports an elliptic curve Diffie-Hellman key exchange (ECDH) protocol and. In some examples, the message is encrypted based at least in part on the ECDH protocol.

In some examples, the configuration supports one or more symmetric cryptographic operations and. In some examples, the message is encrypted based at least in part on the one or more symmetric cryptographic operations.

Figure 6:
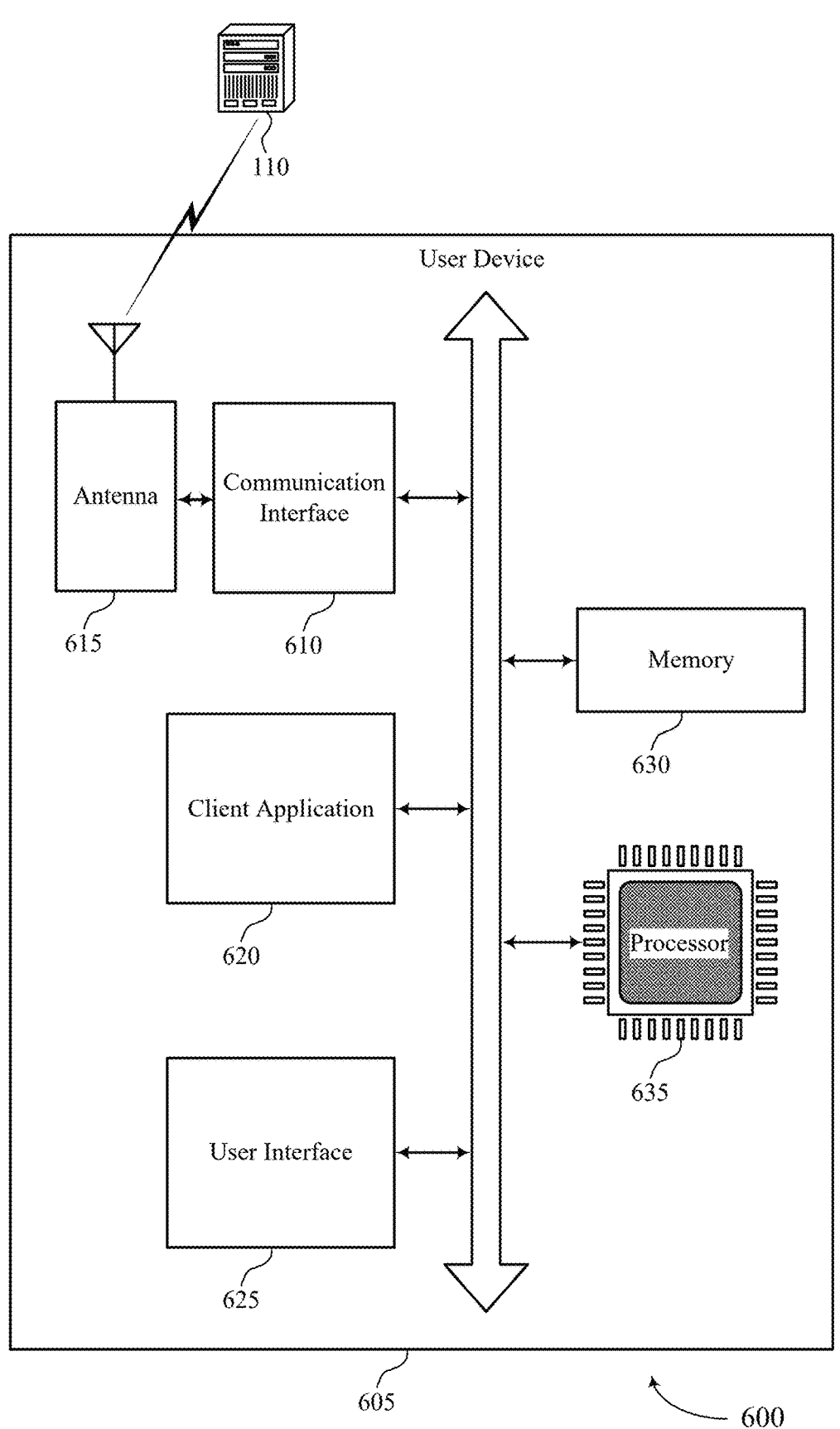
FIG. 6 shows a diagram of a system including a device that supports password hardening for elliptic curve integrated encryption schemes in accordance with aspects of the present disclosure.

FIG. 6 shows a diagram of a system 600 including a device 605 that supports password hardening for elliptic curve integrated encryption schemes in accordance with aspects of the present disclosure. The device 605 may be an example of or include components of a device 405 as described herein. The device 605 may include components for bi-directional voice and data communications including components for transmitting and receiving communications, such as a client application 620, a communication interface 610, one or more antennas 615, a user interface 625, at least one memory 630, and at least one processor 635. Each of these components may communicate, directly or indirectly, with one another (e.g., via one or more buses, communications links, communications interfaces, or any combination thereof).

The communication interface 610 may manage input and output signals for the device 605 via the antenna 615. For example, the communication interface 610 may enable the user device 605 to exchange information (e.g., input information, output information, or both) with other systems or devices, such as custodial token platform 110 (e.g., supported by one or more servers), via one or more wired or wireless communication links. The communication interface 610 may also utilize or interact with antenna 615 to support communication with other systems or devices. In some cases, the communication interface 610 may represent a physical connection or port to an external peripheral, such as a hardware wallet device. In some cases, the communication interface 610 may utilize an operating system such as iOS®, ANDROID®, MS-DOS®, MS-WINDOWS®, OS/2®, UNIX®, LINUX®, or another known operating system. The communication interface 610 may be implemented as part of the processor 635.

In some cases, the device 605 may include a single antenna 615. However, in some other cases, the device 605 may have more than one antenna 615, which may be capable of concurrently transmitting or receiving multiple wireless transmissions. The communication interface 610 may communicate bi-directionally, via the one or more antennas 615, wired, or wireless links as described herein. For example, the communication interface 610 may represent a wireless transceiver and may communicate bi-directionally with another wireless transceiver. The communication interface 610 may also include a modem to modulate the packets, to provide the modulated packets to one or more antennas 615 for transmission, and to demodulate packets received from the one or more antennas 615.

The user interface 625 may represent interact with a keyboard, a mouse, a touchscreen, a microphone, or a similar device or component. In some cases, a user may interact with the user interface 625. In other cases, the user interface 625 may operate automatically without user interaction. The user interface 625 may display or output information such as information received from other systems or devices or information to be transmitted to other systems or devices.

The memory 630 may include RAM and ROM. The memory 630 may store computer-readable, computer-executable software including instructions that, when executed, cause at least one processor 635 to perform various functions described herein. In some cases, the memory 630 may contain, among other things, a BIOS which may control basic hardware or software operation such as the interaction with peripheral components or devices. The memory 630 may be an example of a single memory or multiple memories. For example, the user device 605 may include one or more memories 630.

The processor 635 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 635 may be configured to operate a memory array using a memory controller. In other cases, a memory controller may be integrated into the processor 635. The processor 635 may be configured to execute computer-readable instructions stored in at least one memory 630 to perform various functions (e.g., functions or tasks supporting a method and system for password hardening for elliptic curve integrated encryption schemes). Though a single processor 635 is depicted in the example of FIG. 6, it is to be understood that the user device 605 may include any quantity of one or more of processors 635 and that a group of processors 635 may collectively perform one or more functions ascribed herein to a processor, such as the processor 635. The processor 635 may be an example of a single processor or multiple processors. For example, the device 605 may include one or more processors 635.

The client application 620 may support encryption in accordance with examples as disclosed herein. For example, the client application 620 may be configured as or otherwise support a means for encrypting a message using a public key associated with a private key, the private key being stored in a secure enclave of a computing device, wherein the encryption outputs a ciphertext comprised of a first elliptic curve point and an encrypted message. The client application 620 may be configured as or otherwise support a means for generating a second elliptic curve point using a user-provided password. The client application 620 may be configured as or otherwise support a means for modifying the ciphertext based at least in part on the second elliptic curve point resulting in a modified ciphertext. The client application 620 may be configured as or otherwise support a means for receiving the user-provided password and a request to decrypt the message. The client application 620 may be configured as or otherwise support a means for generating the ciphertext using the user-provided password and the modified ciphertext. The client application 620 may be configured as or otherwise support a means for providing, to the secure enclave, a decryption request and the ciphertext. The client application 620 may be configured as or otherwise support a means for receiving, from the secure enclave in response to the decryption request, the message decrypted using the private key stored in the secure enclave.

By including or configuring the client application 620 in accordance with examples as described herein, the device 605 may support techniques for password hardening for ECIES, which may result in improved reliability related to increased security.

The client application 620 may include an application (e.g., "app"), program, software, extension, or other component which is configured to facilitate communications with a custodial token platform 110 on a server, one or more nodes of a blockchain network 105, other user devices 605, and other devices or systems. For example, the client application 620 may be an application executable on the user device 605, and the client application 620 may be configured to receive data from a custodial token platform 110, transmit data to the custodial token platform 110, process such data, and cause presentation of such data to a user via a user interface 625. The client application 620 may be an example of a wallet application, a wallet device, or both, and may be associated with a wallet address and may access or use a private key to sign messages to facilitate transfer of crypto tokens, messages, transactions, or the like via a blockchain distributed data store.

FIG. 7 shows a flowchart illustrating a method 700 that supports password hardening for elliptic curve integrated encryption schemes in accordance with aspects of the present disclosure. The operations of the method 700 may be implemented by a user device or its components as described herein. For example, the operations of the method 700 may be performed by a user device as described with reference to FIGS. 1 through 6. In some examples, a user device may execute a set of instructions to control the functional elements of the user device to perform the described functions. Additionally, or alternatively, the user device may perform aspects of the described functions using special-purpose hardware.

At 705, the method may include encrypting a message using a public key associated with a private key, the private key being stored in a secure enclave of a computing device, wherein the encryption outputs a ciphertext comprised of a first elliptic curve point and an encrypted message. The operations of 705 may be performed in accordance with examples as disclosed herein. In some examples, aspects of the operations of 705 may be performed by a message encryption manager 525 as described with reference to FIG. 5.

At 710, the method may include generating a second elliptic curve point using a user-provided password. The operations of 710 may be performed in accordance with examples as disclosed herein. In some examples, aspects of the operations of 710 may be performed by a message encryption manager 525 as described with reference to FIG. 5.

At 715, the method may include modifying the ciphertext based at least in part on the second elliptic curve point resulting in a modified ciphertext. The operations of 715 may be performed in accordance with examples as disclosed herein. In some examples, aspects of the operations of 715 may be performed by a message encryption manager 525 as described with reference to FIG. 5.

At 720, the method may include receiving the user-provided password and a request to decrypt the message. The operations of 720 may be performed in accordance with examples as disclosed herein. In some examples, aspects of the operations of 720 may be performed by a message decryption manager 530 as described with reference to FIG. 5.

At 725, the method may include generating the ciphertext using the user-provided password and the modified ciphertext. The operations of 725 may be performed in accordance with examples as disclosed herein. In some examples, aspects of the operations of 725 may be performed by a message decryption manager 530 as described with reference to FIG. 5.

At 730, the method may include providing, to the secure enclave, a decryption request and the ciphertext. The operations of 730 may be performed in accordance with examples as disclosed herein. In some examples, aspects of the operations of 730 may be performed by a message decryption manager 530 as described with reference to FIG. 5.

At 735, the method may include receiving, from the secure enclave in response to the decryption request, the message decrypted using the private key stored in the secure enclave. The operations of 735 may be performed in accordance with examples as disclosed herein. In some examples, aspects of the operations of 735 may be performed by a message decryption manager 530 as described with reference to FIG. 5.

FIG. 8 shows a flowchart illustrating a method 800 that supports password hardening for elliptic curve integrated encryption schemes in accordance with aspects of the present disclosure. The operations of the method 800 may be implemented by a user device or its components as described herein. For example, the operations of the method 800 may be performed by a user device as described with reference to FIGS. 1 through 6. In some examples, a user device may execute a set of instructions to control the functional elements of the user device to perform the described functions. Additionally, or alternatively, the user device may perform aspects of the described functions using special-purpose hardware.

At 805, the method may include encrypting a message using a public key associated with a private key, the private key being stored in a secure enclave of a computing device, wherein the encryption outputs a ciphertext comprised of a first elliptic curve point and an encrypted message. The operations of 805 may be performed in accordance with examples as disclosed herein. In some examples, aspects of the operations of 805 may be performed by a message encryption manager 525 as described with reference to FIG. 5.

At 810, the method may include generating a second elliptic curve point using a user-provided password. The operations of 810 may be performed in accordance with examples as disclosed herein. In some examples, aspects of the operations of 810 may be performed by a message encryption manager 525 as described with reference to FIG. 5.

At 815, the method may include obtaining a third elliptic curve point using the first elliptic curve point and the second elliptic curve point. The operations of 815 may be performed in accordance with examples as disclosed herein. In some examples, aspects of the operations of 815 may be performed by a message encryption manager 525 as described with reference to FIG. 5.

At 820, the method may include modifying the ciphertext based at least in part on the second elliptic curve point resulting in a modified ciphertext. The operations of 820 may be performed in accordance with examples as disclosed herein. In some examples, aspects of the operations of 820 may be performed by a message encryption manager 525 as described with reference to FIG. 5.

At 825, to modify the ciphertext, the method may include modifying the ciphertext based at least in part on the third elliptic curve point resulting in the modified ciphertext. The operations of 825 may be performed in accordance with examples as disclosed herein. In some examples, aspects of the operations of 825 may be performed by a message encryption manager 525 as described with reference to FIG. 5.

At 830, the method may include receiving the user-provided password and a request to decrypt the message. The operations of 830 may be performed in accordance with examples as disclosed herein. In some examples, aspects of the operations of 830 may be performed by a message decryption manager 530 as described with reference to FIG. 5.

At 835, the method may include generating the ciphertext using the user-provided password and the modified cipher-text. The operations of 835 may be performed in accordance with examples as disclosed herein. In some examples, aspects of the operations of 835 may be performed by a message decryption manager 530 as described with reference to FIG. 5.

At 840, the method may include providing, to the secure enclave, a decryption request and the ciphertext. The operations of 840 may be performed in accordance with examples as disclosed herein. In some examples, aspects of the operations of 840 may be performed by a message decryption manager 530 as described with reference to FIG. 5.

At 845, the method may include receiving, from the secure enclave in response to the decryption request, the message decrypted using the private key stored in the secure enclave. The operations of 845 may be performed in accordance with examples as disclosed herein. In some examples, aspects of the operations of 845 may be performed by a message decryption manager 530 as described with reference to FIG. 5.

A method for encryption by an apparatus is described. The method may include encrypting a message using a public key associated with a private key, the private key being stored in a secure enclave of a computing device, wherein the encryption outputs a ciphertext comprised of a first elliptic curve point and an encrypted message, generating a second elliptic curve point using a user-provided password, modifying the ciphertext based at least in part on the second elliptic curve point resulting in a modified ciphertext, receiving the user-provided password and a request to decrypt the message, generating the ciphertext using the user-provided password and the modified ciphertext, providing, to the secure enclave, a decryption request and the ciphertext, and receiving, from the secure enclave in response to the decryption request, the message decrypted using the private key stored in the secure enclave.

An apparatus for encryption is described. The apparatus may include one or more memories storing processor executable code, and one or more processors coupled with the one or more memories. The one or more processors may individually or collectively be operable to execute the code to cause the apparatus to encrypt a message using a public key associated with a private key, the private key being stored in a secure enclave of a computing device, wherein the encryption outputs a ciphertext comprised of a first elliptic curve point and an encrypted message, generate a second elliptic curve point using a user-provided password, modify the ciphertext based at least in part on the second elliptic curve point resulting in a modified ciphertext, receive the user-provided password and a request to decrypt the message, generate the ciphertext using the user-provided password and the modified ciphertext, provide, to the secure enclave, a decryption request and the ciphertext, and receive, from the secure enclave in response to the decryption request, the message decrypted using the private key stored in the secure enclave.

Another apparatus for encryption is described. The apparatus may include means for encrypting a message using a public key associated with a private key, the private key being stored in a secure enclave of a computing device, wherein the encryption outputs a ciphertext comprised of a first elliptic curve point and an encrypted message, means for generating a second elliptic curve point using a user-provided password, means for modifying the ciphertext based at least in part on the second elliptic curve point resulting in a modified ciphertext, means for receiving the user-provided password and a request to decrypt the message, means for generating the ciphertext using the user-provided password and the modified ciphertext, means for providing, to the secure enclave, a decryption request and the ciphertext, and means for receiving, from the secure enclave in response to the decryption request, the message decrypted using the private key stored in the secure enclave.

A non-transitory computer-readable medium storing code for encryption is described. The code may include instructions executable by one or more processors to encrypt a message using a public key associated with a private key, the private key being stored in a secure enclave of a computing device, wherein the encryption outputs a ciphertext comprised of a first elliptic curve point and an encrypted message, generate a second elliptic curve point using a user-provided password, modify the ciphertext based at least in part on the second elliptic curve point resulting in a modified ciphertext, receive the user-provided password and a request to decrypt the message, generate the ciphertext using the user-provided password and the modified ciphertext, provide, to the secure enclave, a decryption request and the ciphertext, and receive, from the secure enclave in response to the decryption request, the message decrypted using the private key stored in the secure enclave.

In some examples of the method, apparatus, and non-transitory computer-readable medium described herein, modifying the ciphertext may include operations, features, means, or instructions for obtaining a third elliptic curve point using the first elliptic curve point and the second elliptic curve point and modifying the ciphertext based at least in part on the third elliptic curve point resulting in the modified ciphertext.

In some examples of the method, apparatus, and non-transitory computer-readable medium described herein, generating the ciphertext may include operations, features, means, or instructions for generating the second elliptic curve point using the user-provided password, generating the first elliptic curve point using the second elliptic curve point and the third elliptic curve point, and generating the ciphertext based at least in part on the first elliptic curve point.

In some examples of the method, apparatus, and non-transitory computer-readable medium described herein, generating the second elliptic curve point may include operations, features, means, or instructions for hashing one or more values of the user-provided password to obtain a first coordinate of the second elliptic curve point and computing a second coordinate of the second elliptic curve point based at least in part on the first coordinate.

In some examples of the method, apparatus, and non-transitory computer-readable medium described herein, encrypting the message may include operations, features, means, or instructions for encrypting the message based at least in part on a configuration of the secure enclave of the computing device.

In some examples of the method, apparatus, and non-transitory computer-readable medium described herein, the configuration supports an elliptic curve integrated encryption scheme (ECIES) protocol and the message may be encrypted based at least in part on the ECIES protocol.

In some examples of the method, apparatus, and non-transitory computer-readable medium described herein, the configuration supports an elliptic curve Diffie-Hellman key exchange (ECDH) protocol and the message may be encrypted based at least in part on the ECDH protocol.

In some examples of the method, apparatus, and non-transitory computer-readable medium described herein, the configuration supports one or more symmetric cryptographic operations and the message may be encrypted based at least in part on the one or more symmetric cryptographic operations.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for encryption, comprising:
encrypting a message using a public key associated with a private key, the private key being stored in a secure enclave of a computing device, wherein the encryption of the message outputs a first ciphertext comprised of a first elliptic curve point and an encrypted message;
receiving a user-provided password;
generating a second elliptic curve point using the user-provided password;
obtaining a third elliptic curve point using the first elliptic curve point and the second elliptic curve point;
modifying the first ciphertext based at least in part on the third elliptic curve point resulting in a modified ciphertext;
receiving the user-provided password and a request to decrypt the encrypted message;
generating a second ciphertext using the user-provided password and the modified ciphertext;
providing, to the secure enclave, an indication of the request to decrypt the encrypted message and the second ciphertext; and
receiving, from the secure enclave in response to the indication and based at least in part on the second ciphertext being the same as the first ciphertext, the message decrypted using the private key stored in the secure enclave.

2. The method of claim 1, wherein generating the second ciphertext comprises:
generating the second elliptic curve point using the user-provided password;
generating the first elliptic curve point using the second elliptic curve point and the third elliptic curve point; and
generating the second ciphertext based at least in part on the first elliptic curve point.

3. The method of claim 1, wherein generating the second elliptic curve point comprises:

hashing one or more values of the user-provided password to obtain a first coordinate of the second elliptic curve point; and
computing a second coordinate of the second elliptic curve point based at least in part on the first coordinate.

4. The method of claim 1, wherein encrypting the message comprises:
encrypting the message based at least in part on a configuration of the secure enclave of the computing device.

5. The method of claim 4, wherein:
the configuration supports an elliptic curve integrated encryption scheme (ECIES) protocol; and
the message is encrypted based at least in part on the ECIES protocol.

6. The method of claim 4, wherein:
the configuration supports an elliptic curve Diffie-Hellman key exchange (ECDH) protocol; and
the message is encrypted based at least in part on the ECDH protocol.

7. The method of claim 4, wherein:
the configuration supports one or more symmetric cryptographic operations; and
the message is encrypted based at least in part on the one or more symmetric cryptographic operations.

8. An apparatus for encryption, comprising:
one or more memories storing processor-executable code; and
one or more processors coupled with the one or more memories and individually or collectively operable to execute the code to cause the apparatus to:
encrypt a message using a public key associated with a private key, the private key being stored in a secure enclave of a computing device, wherein the encryption of the message outputs a first ciphertext comprised of a first elliptic curve point and an encrypted message;
receive a user-provided password;
generate a second elliptic curve point using the user-provided password;
obtain a third elliptic curve point using the first elliptic curve point and the second elliptic curve point;
modify the first ciphertext based at least in part on the third elliptic curve point resulting in a modified ciphertext;
receive the user-provided password and a request to decrypt the encrypted message;
generate a second ciphertext using the user-provided password and the modified ciphertext;
provide, to the secure enclave, an indication of the request to decrypt the encrypted message and the second ciphertext; and
receive, from the secure enclave in response to the indication and based at least in part on the second ciphertext being the same as the first ciphertext, the message decrypted using the private key stored in the secure enclave.

9. The apparatus of claim 8, wherein, to generate the second ciphertext, the one or more processors are individually or collectively operable to execute the code to cause the apparatus to:
generate the second elliptic curve point using the user-provided password;
generate the first elliptic curve point using the second elliptic curve point and the third elliptic curve point; and generate the second ciphertext based at least in part on the first elliptic curve point.

10. The apparatus of claim 8, wherein, to generate the second elliptic curve point, the one or more processors are individually or collectively operable to execute the code to cause the apparatus to:

hash one or more values of the user-provided password to obtain a first coordinate of the second elliptic curve point; and compute a second coordinate of the second elliptic curve point based at least in part on the first coordinate.

11. The apparatus of claim 8, wherein, to encrypt the message, the one or more processors are individually or collectively operable to execute the code to cause the apparatus to:

encrypt the message based at least in part on a configuration of the secure enclave of the computing device.

12. The apparatus of claim 11, wherein:

the configuration supports an elliptic curve integrated encryption scheme (ECIES) protocol; and the message is encrypted based at least in part on the ECIES protocol.

13. The apparatus of claim 11, wherein:

the configuration supports an elliptic curve Diffie-Hellman key exchange (ECDH) protocol; and the message is encrypted based at least in part on the ECDH protocol.

14. The apparatus of claim 11, wherein:

the configuration supports one or more symmetric cryptographic operations; and the message is encrypted based at least in part on the one or more symmetric cryptographic operations.

15. A non-transitory computer-readable medium storing code for encryption, the code comprising instructions executable by one or more process ors to:

encrypt a message using a public key associated with a private key, the private key being stored in a secure enclave of a computing device, wherein the encryption of the message outputs a first ciphertext comprised of a first elliptic curve point and an encrypted message;

receive a user-provided password;

generate a second elliptic curve point using the user-provided password;

obtain a third elliptic curve point using the first elliptic curve point and the second elliptic curve point;

modify the first ciphertext based at least in part on the third elliptic curve point resulting in a modified ciphertext;

receive the user-provided password and a request to decrypt the encrypted message;

generate a second ciphertext using the user-provided password and the modified ciphertext;

provide, to the secure enclave, an indication of the request to decrypt the encrypted message and the second ciphertext; and receive, from the secure enclave in response to the indication and based at least in part on the second ciphertext being the same as the first ciphertext, the message decrypted using the private key stored in the secure enclave.

16. The non-transitory computer-readable medium of claim 15, wherein the instructions to generate the second ciphertext are executable by the one or more processors to:

generate the second elliptic curve point using the user-provided password;

generate the first elliptic curve point using the second elliptic curve point and the third elliptic curve point; and generate the second ciphertext based at least in part on the first elliptic curve point.

17. The non-transitory computer-readable medium of claim 15, wherein the instructions to generate the second elliptic curve point are executable by the one or more processors to:

hash one or more values of the user-provided password to obtain a first coordinate of the second elliptic curve point; and compute a second coordinate of the second elliptic curve point based at least in part on the first coordinate.

* * * * *